(12) United States Patent
Miki et al.

(10) Patent No.: US 6,500,362 B2
(45) Date of Patent: Dec. 31, 2002

(54) CONDUCTIVE PASTE AND CERAMIC ELECTRONIC COMPONENT

(75) Inventors: Takeshi Miki, Omihachiman (JP); Atsuyoshi Maeda, Otsu (JP)

(73) Assignee: Murata Manufacturing Co. Ltd. (JP)

( * ) Notice: Subject to any disclaimer, the term of this patent is extended or adjusted under 35 U.S.C. 154(b) by 0 days.

(21) Appl. No.: 09/779,270

(22) Filed: Feb. 8, 2001

(65) Prior Publication Data

US 2001/0015603 A1 Aug. 23, 2001

(30) Foreign Application Priority Data

Feb. 9, 2000 (JP) .......................... 2000-031737

(51) Int. Cl.$^7$ ................................. H01B 1/02
(52) U.S. Cl. ........................ 252/514; 252/521
(58) Field of Search ................. 252/513, 514, 252/521

(56) References Cited

U.S. PATENT DOCUMENTS

| | | | | |
|---|---|---|---|---|
| 5,162,062 A | * | 11/1992 | Carroll et al. ............ | 148/24 |
| 5,698,015 A | * | 12/1997 | Mohri et al. ............. | 252/512 |
| 5,785,879 A | * | 7/1998 | Kawamura et al. ........ | 264/614 |
| 6,008,981 A | * | 12/1999 | Harada et al. ........... | 361/321.4 |
| 6,060,165 A | * | 5/2000 | Asada et al. ............. | 428/403 |
| 6,217,821 B1 | * | 4/2001 | Donohue ................. | 156/89.16 |

* cited by examiner

Primary Examiner—Cathy Lam
(74) Attorney, Agent, or Firm—Dickstein, Shapiro, Morin & Oshinsky LLP

(57) ABSTRACT

A conductive paste containing no Pb and able to suppress heat generation in a sintered ceramic body, and a medium and high voltage ceramic capacitor with thick film electrodes formed thereof, are provided. The conductive paste containing substantially no Pb is composed of an Ag powder, a glass powder having on a % by mole basis, $30 < MO \leq 40$; $10 \leq Bi_2O_3 \leq 60$; and $10 \leq B_2O_3 \leq 60$, where M indicates at least one alkaline earth metal, and a vehicle. The medium and high voltage ceramic capacitor provides thick film electrodes made of the aforementioned conductive paste on two end faces of the sintered ceramic body made of, for instance, barium titanate.

6 Claims, 2 Drawing Sheets

CONDUCTIVE PASTE AND CERAMIC ELECTRONIC COMPONENT

BACKGROUND OF THE INVENTION

1. Field of the Invention

The present invention relates to a conductive paste used for forming an electrode of a ceramic electronic component and to a ceramic electronic component.

2. Description of the Related Art

Ceramic electronic components are provided with sintered ceramic body made of ceramic materials, for example, dielectrics, semiconductors, and piezoelectric materials. Conductive pastes have been frequently used as materials for electrodes and wirings accompanying these ceramic electronic components.

In the conductive paste used for forming an electrode of a ceramic electronic component, a glass powder is added in some cases. The addition of the glass powder to the conductive paste generally has the effect, for example, of softening and fluidizing during the firing of an electrode so as to accelerate sintering of the conductive powder, of improving adhesive strength of a thick film electrode, and furthermore, of filling in pores generated at the interface between the thick film electrode and the sintered ceramic body so as to prevent capacitance from decreasing in the case in which the electronic component is a ceramic capacitor.

As conventional conductive pastes used for forming electrodes of ceramic electronic components, Pb glasses have been frequently used. In recent years, however, in consideration of environmental problems, it is necessary to substitute these with non-Pb glasses.

Ceramic electronic components, in particular, medium and high voltage ceramic capacitors with electrodes formed using conductive pastes containing conventional non-Pb glass, for example, Bi glass, have problems in that the heat-generating temperatures of sintered ceramic body are higher than those of medium and high voltage ceramic capacitors with electrodes formed using conventional conductive pastes containing Pb glass. This is believed to be due to the Bi in the glass diffusing into the ceramic and being reduced so as to become a semiconductor while being applied with a high voltage and high frequencies, and therefore, tan δ of the sintered ceramic body increases.

SUMMARY OF THE INVENTION

The present invention was made to solve the aforementioned problems. Accordingly, objects of the present invention are to provide a conductive paste containing no Pb glass and suppressing heat generation in a sintered ceramic body, and to provide an electronic component with thick film electrodes formed thereof.

So as to achieve the aforementioned objects, a conductive paste according to the present invention is a conductive paste containing substantially no Pb and used for forming a thick film electrode of a ceramic electronic component, comprising a conductive powder containing Ag; a glass powder containing Bi, B and at least one alkaline earth metal selected from the group consisting of Ca, Sr, and Ba; and a vehicle, wherein when the alkaline earth metal, bismuth, and boron are expressed as oxides MO, $Bi_2O_3$, and $B_2O_3$, respectively, the content of the oxides are in the following ranges on a basis of % by mole relative to 100% by mole of the glass composition, $30 < MO \leq 40$; $10 \leq Bi_2O_3 \leq 60$; and $10 \leq B_2O_3 \leq 60$, where M indicates the alkaline earth metal.

The content of the aforementioned glass powder is preferably about 1 to 15% by volume relative to 100% by volume of the aforementioned conductive powder.

A ceramic electronic component according to the present invention comprises a sintered ceramic body and thick film electrodes formed on two end faces of the sintered ceramic body using a conductive paste according to the present invention.

DESCRIPTION OF THE PREFERRED EMBODIMENTS

Figure 1:
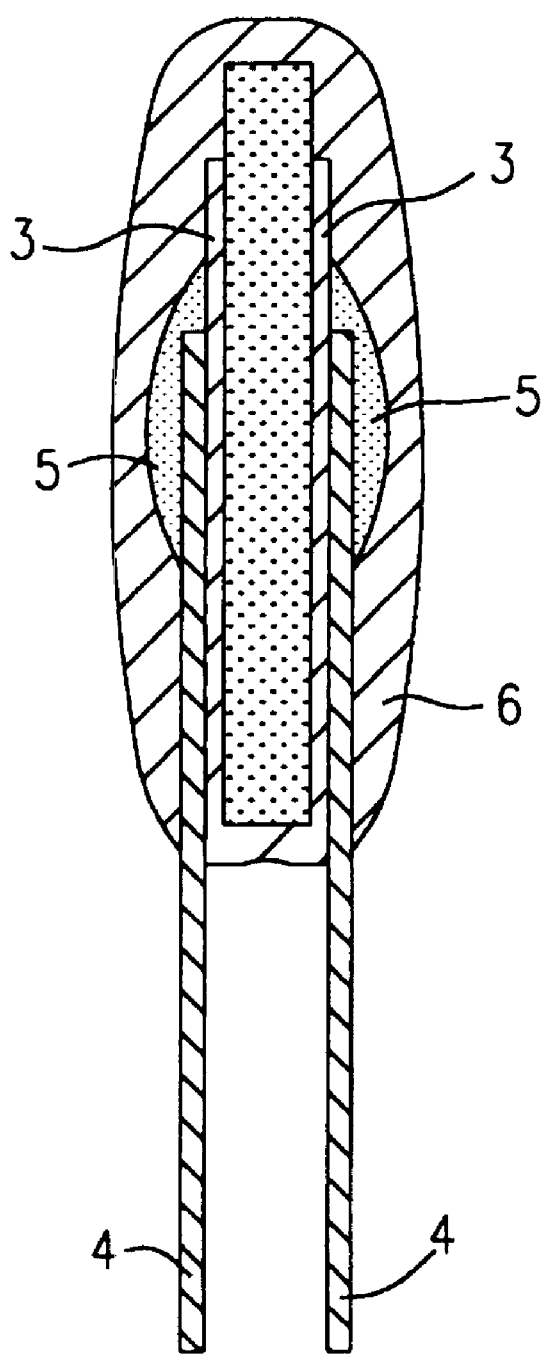
FIG. 1 is a sectional view of a ceramic electronic component according to an embodiment of the present invention.

The conductive paste according to the present invention contains an "alkaline earth metal—B—Bi—O glass" so as to exhibit a superior effect of suppressing heat generation, especially in a medium and high voltage ceramic capacitor with a rated voltage of 250 volts or more, and furthermore, of 500 volts or more. This is considered to be due to the fact that diffusion of the Bi in the glass into a sintered ceramic body is suppressed even while being used even at such a high voltage, and therefore, tan δ of the sintered ceramic body is prevented from increasing.

An alkaline earth metal component, being one of the primary components, has a function of suppressing the diffusion of Bi in the glass into the sintered ceramic body. As the alkaline earth metal component, at least one metal selected from the group consisting of Ca, Sr and Ba can be appropriately used. Ca or Sr are preferably used in consideration of handling in manufacture of the glass and in view of the burden on the environment.

The content of the aforementioned alkaline earth metal component must be more than about 30 mole % and be about 40 mole % or less calculated as the oxide relative to 10 mole % of glass composition. When the content is about 30 mole % or less, the effect of suppressing diffusion of bismuth of the glass into the sintered ceramic body is decreased. On the other hand, when the content exceeds about 40 mole %, vitrification becomes difficult.

The content of bismuth must be about 10 mole % or more and about 60 mole % or less as the oxide relative to 100 mole % of the glass composition. When the content is less than about 10 mole %, vitrification becomes difficult. On the other hand, when the content exceeds 60 mole %, bismuth is likely to diffuse into the sintered ceramic body so as to cause heat generation of the sintered ceramic body.

The content of boron must be 10 mole % or more and 60 mole % or less as the oxide relative to 100 mole % of glass composition. When the content is either less than 10 mole % or more than 60 mole %, vitrification becomes difficult.

Furthermore, a variety of arbitrary components may be present as long as the effects and the composition rates of the present invention are maintained. For example, the aforementioned glass may contain substantially no silicon oxide; silicon oxide may be, however, added in small amounts within the range 10 mole % or less as the oxide relative to 100 mole % of glass composition so as to control softening point, to improve plating resistance, etc.

The content of the glass to the conductive paste is preferably about 1 to 15% by volume relative to 100% by volume of the conductive powder. When the content of the glass is less than about 1% by volume, the effect of the addition of the glass is small, and the effect of accelerating firing of the Ag powder due to softening and fluidizing, the effect of improving adhesive strength of the thick film electrodes, and the effect of suppressing decrease in capacitance by preventing pores from being generated cannot be sufficiently exhibited. On the other hand, when the content of the glass exceeds about 15% by volume, the glass may segregate on the surfaces of the electrodes so as to cause non-wetting of solder and inferior plating.

A ceramic electronic component according to the present invention, for example, a ceramic capacitor 1 as shown in FIG. 1, is composed of a sintered ceramic body 2, a pair of thick film electrodes 3 formed on two end faces of the sintered ceramic body 2 using a conductive paste according to the present invention, lead wires 4 electrically connected to the thick film electrodes 3, solders 5 electrically and mechanically connecting the thick film electrodes 3 and the lead wires 4, and a protective resin 6 completely covering the sintered ceramic body 2, the thick film electrodes 3 and the solders 5, and covering one end of the lead wires 4.

The sintered ceramic body 2 is composed of a fired single plate type or laminate type green ceramic structure made of a material functioning as, for example, a dielectric, a magnetic material and an insulator. A sintered ceramic body in a ceramic electronic component of the present invention is, however, not limited to these. In the case in which a ceramic electronic component of the present invention constitutes a medium and high voltage ceramic capacitor, a sintered ceramic body containing a dielectric ceramic composition, for example, barium titanate, calcium titanate, barium zirconate and magnesium titanate, as a primary component is preferable.

The thick film electrodes 3 are made of the aforementioned conductive paste according to the present invention, and are made by, for example, steps of coating the conductive paste on two end faces of the sintered ceramic body 2, drying and thereafter, baking. The thick film electrodes 3 may also be formed by steps of coating the conductive paste according to the present invention on two end faces of a green ceramic structure before firing so as to form electrode films, and thereafter firing the electrode films and the green ceramic structure at the same time. That is, the forming manner therefor is not specifically limited.

The shape of the ceramic electronic component of the present invention is not limited to that of a ceramic capacitor as shown in FIG. 1. For example, a ceramic electronic component according to the present invention may be a laminated ceramic electronic component providing a sintered ceramic body made by firing a ceramic structure which is a laminate of a plurality of ceramic green sheets and a pair of thick film electrodes formed using the conductive paste according to the present invention on two end faces of the sintered ceramic body. Materials for the lead wire and the protective resin are not specifically limited, and these may not be present.

EXAMPLES

Starting materials, that is, an alkaline earth metal hydroxide, $Bi_2O_3$ and $H_3BO_3$, were blended so as to prepare samples having compositions as shown in Tables 1 to 3. Each sample was put into a crucible made of alumina and was kept at 900 to 1,300° C. for 1 hour in a furnace. After confirming that the samples were completely fused, they were taken out of the furnace and were put into purified water so as to produce bead glasses. The resulting bead glasses were wet milled using a ball mill so as to produce the glass powders designated Samples 1 to 21. In a manner similar to that for the aforementioned samples, the starting materials were also blended so as to produce a Pb glass and a B—Ba—Zn—O glass, and were vitrified after fusing so as to prepare glass powders designated Samples 22 and 23, respectively.

32% by volume of Ag powder having particle diameters of 0.1 to 5 µm, 5% by volume of glass powder of Samples 1 to 23, and 63% by volume of vehicle were blended and kneaded using a three-roll mill so as to produce conductive pastes of Samples 1 to 23. The aforementioned vehicle was prepared by dissolving ethyl cellulose into terpineol in a ratio of 20% by weight.

Both primary faces of the sintered ceramic body 2, containing $BaTiO_3$ as a primary component so as to have a capacitance of 1 nF, were screen printed with 3 mm diameter patterns of the conductive pastes of Samples 1 to 23, and were fired in air at 800° C. for 2 hours so as to form thick film electrodes 3. Then, lead wires 4 were soldered to the thick film electrodes 3 of Samples 1 to 23 with solders 5, and the sintered ceramic body 2, the thick film electrodes 3, one end of the lead wires 4, and the solders 5 were covered using a protective resin 6 so as to produce ceramic capacitors 1, as shown in FIG. 1, of Samples 1 to 23.

Next, 3 kVp-p of AC voltage was applied to the ceramic capacitors 1 of Samples 1 to 23, and the surface temperatures of the protective resins 6 were measured using thermocouples. The results are shown in Tables 1 to 4, respectively.

In the evaluation results, a Sample having an equivalent or lower heat-generating temperature compared to a ceramic capacitor 1 of Sample 22 using a conventional Pb glass is indicated by "○". A Sample having a higher heat-generating temperature compared to the ceramic capacitor 1 of Sample 22 is indicated by "x".

TABLE 1

| Sample | Glass Composition (mole %) | | | Heat Generating Temperature (° C.) | Evaluation |
| --- | --- | --- | --- | --- | --- |
| | CaO | $Bi_2O_3$ | $B_2O_3$ | | |
| 1 | 20 | 40 | 40 | 37.7 | X |
| 2 | 31 | 57 | 12 | 27.1 | ○ |
| 3 | 31 | 33 | 36 | 27.3 | ○ |
| 4 | 31 | 12 | 57 | 27.4 | ○ |
| 5 | 40 | 50 | 10 | 27.2 | ○ |
| 6 | 40 | 30 | 30 | 27.3 | ○ |
| 7 | 40 | 10 | 50 | 27.0 | ○ |

TABLE 2

| Sample | Glass Composition (mole %) | | | Heat Generating Temperature (° C.) | Evaluation |
| --- | --- | --- | --- | --- | --- |
| | SrO | $Bi_2O_3$ | $B_2O_3$ | | |
| 8 | 20 | 40 | 40 | 36.7 | X |
| 9 | 31 | 57 | 12 | 27.3 | ○ |
| 10 | 31 | 33 | 36 | 27.3 | ○ |
| 11 | 31 | 12 | 57 | 27.2 | ○ |
| 12 | 40 | 50 | 10 | 27.1 | ○ |
| 13 | 40 | 30 | 30 | 27.3 | ○ |
| 14 | 40 | 10 | 50 | 27.2 | ○ |

TABLE 3

| Sample | Glass Composition (mole %) | | | Heat Generating Temperature (° C.) | Evaluation |
|---|---|---|---|---|---|
| | BaO | $Bi_2O_3$ | $B_2O_3$ | | |
| 15 | 20 | 40 | 40 | 36.9 | X |
| 16 | 31 | 57 | 12 | 27.1 | ○ |
| 17 | 31 | 33 | 36 | 27.3 | ○ |
| 18 | 31 | 12 | 57 | 27.2 | ○ |
| 19 | 40 | 50 | 10 | 27.4 | ○ |
| 20 | 40 | 30 | 30 | 27.2 | ○ |
| 21 | 40 | 10 | 50 | 27.3 | ○ |

TABLE 4

| Sample | Glass Composition | Heat Generating Temperature (° C.) | Evaluation |
|---|---|---|---|
| 22 | PbO glass | 27.4 | — |
| 23 | Ba—Zn—B—O glass | 38.2 | X |

As is clear from the results of measurements of the conventional conductive pastes, that is, Sample 22 using Pb glass as a glass powder and Sample 23 using B—Ba—Zn—O glass, as shown in Table 4, the heat generating temperature of Sample 22 regarded as the standard of the conventional techniques was 27.4° C., while a heat-generating temperature of Sample 23 was 38.2° C.

Figure 2:
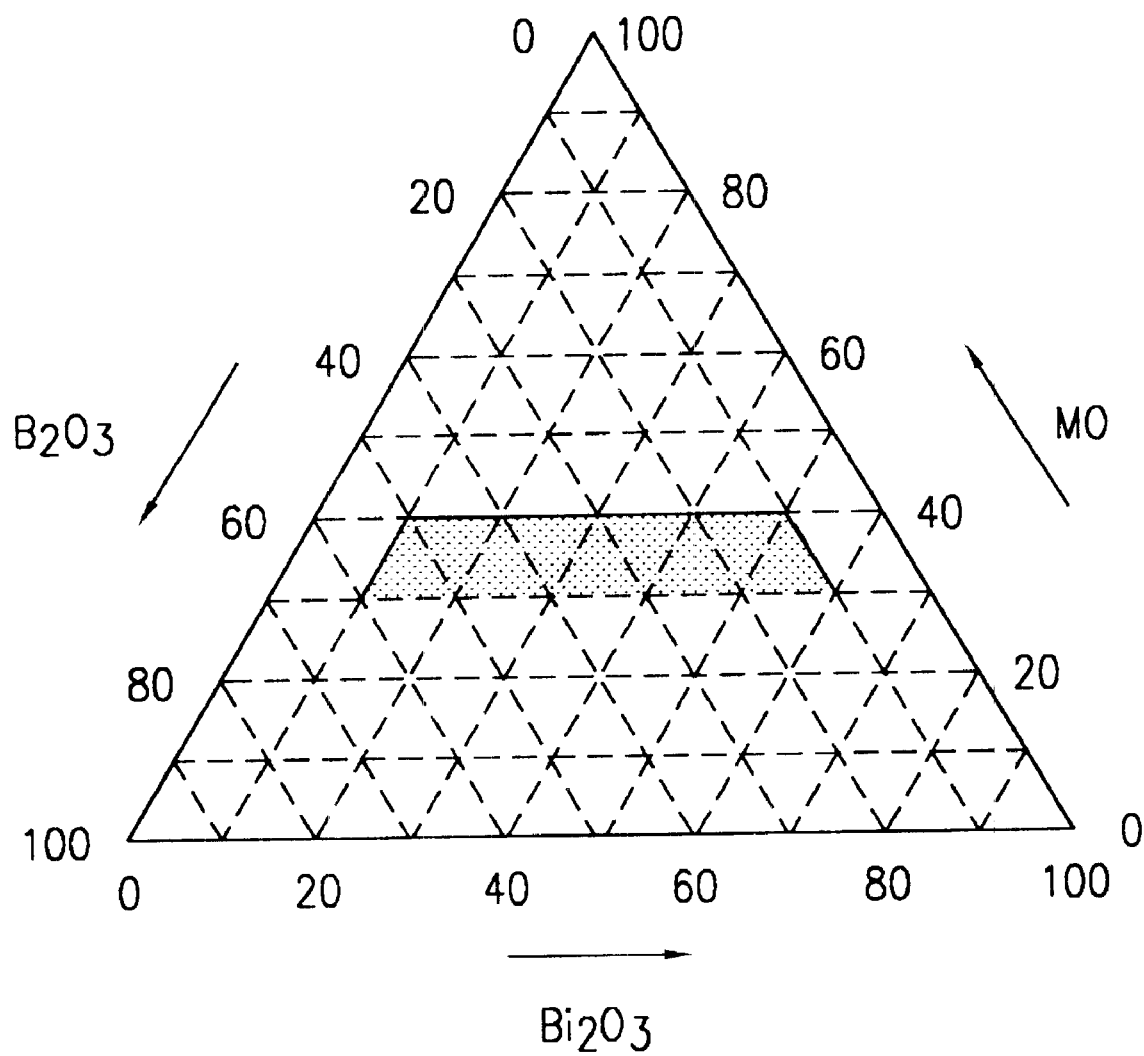
FIG. 2 is a ternary compositional diagram of a conductive paste according to a first aspect of the present invention.

Among Samples 1 to 21 as shown in Tables 1 to 3, Samples 2 to 7, 9 to 14, and 16 to 21 were composed of alkaline earth metals, that is, Ca, Sr and Ba, in a total amount within the range of more than about 30 mole % and 40 mole % or less in terms of CaO, SrO and BaO, respectively, bismuth in an amount of about 10 to 60 mole % in terms of $Bi_2O_3$, and boron in an amount of about 10 to 60 mole % in terms of $B_2O_3$. The resulting heat generating temperatures of these samples were 27.0 to 27.4° C., and therefore, these temperatures were equivalent to or less than the heat generating temperature of 27.4° C. of Sample 22 regarded as a standard of conventional techniques. These are superior results. A ternary compositional diagram regarding Samples 2 to 7, 9 to 14, and 16 to 21 is shown in FIG. 2.

On the other hand, heat-generating temperatures of Samples 1, 8 and 15 were 36.7 to 37.7° C. These temperatures far exceeded the heat generating temperature of 27.4° C. of Sample 22 which is regarded as the standard of the conventional techniques.

As described above, by using the conductive paste of the present invention, a ceramic electronic component in which heat generation of a sintered ceramic body can be suppressed to an extent equivalent to or greater than that of the Pb glass is provided.

When the content of the aforementioned glass powder is about 1 to 15% by volume relative to 100% by volume of the conductive powder, and when thick film electrodes are formed using the conductive paste, the effects of suppressing segregation of glass on the surfaces of the electrodes, non-wetting of solder and inferior plating are increased.

What is claimed is:

1. A conductive paste containing substantially no Pb and adapted for forming a thick film electrode of a ceramic electronic component, comprising:

a conductive powder comprising Ag;

a glass powder containing Bi, B and at least one alkaline earth metal selected from the group consisting of Ca, Sr and Ba; and a vehicle, wherein when the alkaline earth metal, bismuth, and boron are expressed as the oxides MO in which M is the alkaline earth metal, $Bi_2O_3$, and $B_2O_3$, respectively, the respective contents of said oxides are in the following ranges on a basis of % by mole relative to 100% by mole of glass composition:

$$30 < MO \leq 40;$$

$$10 \leq Bi_2O_3 \leq 60;$$

and $$10 \leq B_2O_3 \leq 60.$$

2. A conductive paste according to claim 1, wherein the content of the glass powder is about 1 to 15% by volume relative to 100% by volume of the conductive powder.

3. A conductive paste according to claim 2, containing substantially no silicon oxide.

4. A conductive paste according to claim 2, containing silicon oxide.

5. A conductive paste according to claim 1, containing substantially no silicon oxide.

6. A conductive paste according to claim 1, containing silicon oxide.

* * * * *